United States Patent [19]

Iyer

[11] Patent Number: 4,644,022

[45] Date of Patent: Feb. 17, 1987

[54] COLD-SETTING COMPOSITIONS FOR FOUNDRY SAND CORES AND MOLDS

[75] Inventor: Raja Iyer, Hazelcrest, Ill.

[73] Assignee: Acme Resin Corporation, Westchester, Ill.

[21] Appl. No.: 802,280

[22] Filed: Nov. 27, 1985

[51] Int. Cl.$^4$ .......................... C08K 3/34; B22C 11/22
[52] U.S. Cl. .................................... 523/144; 523/145; 523/147
[58] Field of Search ........................ 523/144, 145, 147

[56] References Cited

U.S. PATENT DOCUMENTS

| | | | |
|---|---|---|---|
| 2,489,336 | 11/1949 | Spahr et al. | 528/155 |
| 3,525,379 | 8/1970 | Johnson et al. | 164/16 |
| 3,549,584 | 12/1970 | Sekera | 523/144 |
| 3,551,365 | 12/1970 | Matalon | 523/147 |
| 3,644,274 | 2/1972 | Maurukas | 523/144 |
| 3,839,251 | 10/1974 | Bornstein | 524/841 |
| 3,903,041 | 9/1975 | Bornstein | 524/14 |
| 4,055,528 | 10/1977 | Kim | 524/594 |
| 4,089,837 | 5/1978 | Lettinger et al. | 523/147 |
| 4,287,092 | 9/1981 | Stewart et al. | 523/144 |
| 4,336,179 | 6/1982 | Iyer | 523/145 |
| 4,495,316 | 1/1985 | Armbruster | 523/139 |

*Primary Examiner*—Lewis T. Jacobs
*Attorney, Agent, or Firm*—Stanley M. Parmerter

[57] ABSTRACT

A cold-setting foundry binder composition, which provides foundry cores and molds with improved curing speed, comprising a particulate refractory material, a resin binder, an acid curing catalyst, and an accelerator. The accelerator is selected from the group: dihydroxybenzenes, derivatives of dihydroxybenzenes, trihydroxybenzenes, and their mixtures.

14 Claims, No Drawings

COLD-SETTING COMPOSITIONS FOR FOUNDRY SAND CORES AND MOLDS

FIELD OF THE INVENTION

This invention relates to improved cold-setting compositions and to a process using these compositions for making foundry sand cores and molds.

BACKGROUND OF THE INVENTION

Foundry cores and molds used in making metal castings are normally prepared from a composition including sand or similar material and a curable or polymerizable binder coated on the sand particles. The purpose of this binder coating is to permit the mixture to be hardened after it is first shaped or molded into a desired form. Typically, after the aggregate material and binder have been mixed, the resulting mixture is rammed, blown or otherwise formed to the desired shape or pattern and then cured with the use of catalysts and/or heat to a solid, cured state.

When molten metal is poured onto a sand mold, it solidifies taking the shape or pattern of the mold. The temperature of the molten metal is so high that the resin binder burns out of the mold. The mold then collapses leaving free-flowing sand that can be reused to make a new mold.

Different processes for forming molds and cures have been developed in the foundry industry. One process known as the "hot-box" process requires that the mixture of aggregate material and binder be cured and hardened in a holding pattern or core box while subjected to heat. Other processes which use binder systems that do not require heating in order to bring about curing or hardening are known as "no-bake" processes. The present invention is directed to an improved cold-setting binder composition for use in a "no-bake" process.

Phenol-formaldehyde resole resins, as well as furfuryl alcohol, urea-formaldehyde resins, and their mixtures have been used as binders in "no-bake" processes. In such processes, the foundry sand is usually mixed with an aromatic sulfonic acid catalyst before the resin binder is added to the mixture.

In order to increase the cure speed in "no-bake" systems, it is frequently necessary to increase the amount of sulfonic acid catalysts employed. This is particularly true in cold weather when the sand is at a low temperature. Use of higher catalyst levels is undesirable not only from the cost basis but because such sulfonic acid catalyst levels cause higher sulfur dioxide emissions during pouring of the molten metal. Furthermore, when sand with high catalyst levels is reclaimed for reuse, it has high residual acidity and higher amounts of elemental sulfur. Such residual acidity means larger amounts of new sand must be added to the reused sand. The elemental sulfur is also undesirable since it can be picked up by the molten metal, resulting in serious casting defects.

One way to increase the curing speed of a phenolic resole "no-bake" resin binder is disclosed in U.S. Pat. No. 4,336,179. The resins of that disclosure contain a monohydric phenol which is added after the resole is formed. However, these products often require the use of a fairly high level of catalyst.

We now have discovered that when certain polyhydroxy compounds are added to cold-setting "no-bake" compositions, they accelerate curing of these resins without the need to use increased amounts of catalyst. Such accelerators permit the use of even less than normal amounts of catalyst thereby reducing the level of sulfur dioxide emission, the residual acidity of the re-used sand, and the amount of undesirable elemental sulfur remaining in the reclaimed sand.

SUMMARY OF THE INVENTION

In accordance with this invention, there is provided a cold-setting foundry composition for foundry cores and molds comprising: (a) a particulate refractory material; (b) between about 0.5 and about 6 parts by weight per 100 parts of particulate refractory material of a resin binder; (c) between about 10 parts and about 70 parts by weight per 100 parts of resin binder of an acidic curing catalyst; and (d) between about 2 parts and about 30 parts by weight per 100 parts of resin binder of an accelerator selected from the group: dihydroxybenzenes, monoalkyl derivatives of dihydroxybenzenes, trihydroxybenzenes, and mixtures thereof.

Also provided, in accordance with this invention, is a "no-bake" process for making a shaped article, such as a foundry core or mold, which comprises: (a) mixing a particulate refractory material, an acidic catalyst, a resin binder, and between about 2 parts and about 30 parts by weight per 100 parts of resin binder of an accelerator selected from the group: dihydroxybenzenes, monoalkyl derivatives of dihydroxybenzenes, trihydroxybenzenes, and mixtures thereof; (b) forming the mixture of refractory material, catalyst, binder, and accelerator into the desired shape; and (c) allowing the shaped mixture to cure at ambient conditions to produce said shaped article.

DETAILED DESCRIPTION OF THE INVENTION

As noted above, the process for forming "no-bake" cores and molds, according to this invention, involves mixing sand or other refractory material with a resin binder, an acidic catalyst, and an accelerator as herein described. This invention involves bringing the novel mixture into contact with patterns to form cores or molds suitable for casting metal, curing the core or mold, and removing it from the pattern. The procedures involved in forming the molds and cores are those generally applied in the "no-bake" foundry art.

Any refractory material commonly used to make foundry cores and molds can be used in the composition and process of this invention. Such refractory material includes silica sands, lake sands, bank sands, zircon sand, chromite sand, olivine sand, and the like. Also, mixtures of these materials may be used.

Any of the phenolic or furan resin binders commonly used in the "no-bake" process can be employed in the compositions and process of the present invention. Between about 0.5 parts and about 6 parts by weight of resin binder per 100 parts of refractory material are used.

Useful phenolic resins are phenolic resoles prepared by the reaction of phenol with excess formaldehyde in the presence of alkaline catalysts. Commercial resins with solids content of 60 to 80%, with viscosities ranging from 50 to 300 centipoises (cps), and containing between 10 and 25% water are widely used in the foundry industry. Such resins are described in U.S. Pat. Nos. 4,055,528 and 4,495,316. Phenolic resole resins with improved storage stability are disclosed in copending U.S. patent application Ser. No. 742,688, filed June 10, 1985.

Furan-based "no-bake" resin binders are compositions containing furfuryl alcohol and formaldehyde; furfuryl alcohol, urea, and formaldehyde; furfuryl alcohol, phenol and formaldehyde; and furfuryl alcohol, phenol, urea, and formaldehyde. Such furan-based "no-bake" resin binders are disclosed in U.S. Pat. Nos. 3,549,584 and 3,644,274.

The resin binders useful in the composition and process of this invention are generally cured with acid catalysts. Any acidic catalysts ordinarily used for curing phenolic and furan-based resins may be utilized. Acids that are generally useful in the "no-bake" process are strong organic acids, strong mineral acids, and combinations of these. Exemplary are such acids as benzenesulfonic acid, xylenesulfonic acid, p-toluenesulfonic acid, sulfuric acid, phosphoric acid, and mixtures thereof. The catalysts are usually dissolved in a sufficient amount of a water-alcohol mixture so that they can be easily mixed with the sand or other particulate material. Generally, between about 10 parts and about 50 parts by weight of catalyst per 100 parts of resin binder are employed.

The accelerators used in the practice of this invention are polyhydroxy aromatic compounds. These include the dihydroxybenzenes: catechol, resorcinol, hydroquinone, and their methylenebis and similar derivatives formed by the condensation of two molecules with an aldehyde. Also suitable are the monoalkyl, monoaryl, and aralkyl derivatives of the dihydroxybenzenes, such as orcinol (5-methylresorcinol), 4-methylcatechol, 3-propylcatechol, 4-propylcatechol, 2-methylhydroquinone, 2,3,4'-trihydroxydiphenyl, and the like. Also useful are trihydroxybenzenes, such as pyrogallol and phloroglucinol. Mixtures of these compounds may also be used. Preferred accelerators are catechol and resorcinol.

Since the accelerators are solids, they are dissolved in a solvent for ease of mixing with the sand or other particulate material. In general, any polar solvent which will dissolve the accelerator can be used. Suitable solvents include water, lower aliphatic alcohols, furfuryl alcohol, and mixtures thereof. Furfuryl alcohol is a particularly suitable solvent since it combines with the resin and enhances the curing process.

It has been found that between about 2 parts and about 30 parts by weight of the accelerator per 100 parts of resin binder are effective in accelerating the curing rate of the resin-sand mixtures. Generally, the use of any amount of accelerator will give some increase in the speed of cure of the resin. However, the use of less than about 2 parts by weight of accelerator per 100 parts of resin binder will result in too small an improvement in curing speed to have commercial significance. If the total amount of accelerator added exceeds about 30 parts by weight per 100 parts of the resin binder, it is possible that there may be too great a reduction in the final tensile strength of the core or mold.

In the practice of this invention, each of the components of the composition are kept separate and not mixed until they are ready to be used. If the resin, catalyst, and accelerator were mixed prematurely, they would react with one another and destroy the binding efficiency of the mixture. Although the order of addition of the components to the sand or other particulate matter is not critical, it is convenient to add the catalyst to the sand and to mix this thoroughly before the other two components are added. Such mixing is carried out just before the cold-setting composition is placed in the mold or suitable pattern.

It is often the practice in the foundry art to include a variety of additives in the resins used to prepare foundry cores and molds. These additives include such materials as silanes, sources of fluoride ion, deodorizing agents, and the like. In the "no-bake" applications, it is often convenient to add urea which combines with the free formaldehyde present. Such additives may be used in the present process and do not interfere with the improved curing speeds observed in these processes.

The following examples illustrate the invention. It is to be understood that the examples are illustrative only and do not intend to limit the invention in any way. In the examples, all parts and percentages are by weight, the temperatures are degrees centigrade, and the viscosity values are in centipoises unless otherwise indicated.

EXAMPLE 1

In this example, sand cores were prepared using a phenolic resin binder with and without an accelerator. The resin used was a commercially available phenolic resole resin, Acme Super Set 970, available from the Acme Resin Corporation, Forest Park, Ill. It has a viscosity (25° C.) of 80 cps, a water content of 12.5%, and contains no nitrogen.

To a K-45 KitchenAid mixer was added 2500 grams of Wedron 730 washed and dried silica sand. The sand was brought to a temperature of 28° C. Eight grams of a benzenesulfonic acid-based catalyst comprising an 80% solution of benzenesulfonic acid plus about 1% sulfuric acid in methanol was added, and the combination was mixed for 1 minute. Then a total of 25 g of resin solution plus accelerator solution was added before mixing was continued for another minute. Part of the sand was immediately used to form standard American Foundrymen's Society 1-inch dog-bone tensile briquets in a Dietert No. 696, 12-cavity tensile core box. The cores were cured at room temperature for 24 hours before testing. Tensile strength measurements were made using a Detroit Testing Machine Company, Model CST tensile tester. Average tensile data in pounds per square inch (psi) are given in Table I. The rest of the sand was used to make a truncated pyramid core 12 inches high, 4 inches square at the base, and 2 inches square at the top, using a Dietert 623-50 core box. Sand was poured into the core box and jolted four times using a Dietert 623 core box jolter. A thermometer was inserted about 4 inches into the core. The strip time was determined as the time at which the core was cured so hard that the thermometer could no longer be pushed by hand deeper into the core. The results given in Table I show that resorcinol is an effective accelerator giving faster curing than the comparative tests which did not use this material.

TABLE I

| | Resin (grams) | Accelerator (grams) | Strip Time (seconds) | Tensile Strength (psi) |
|---|---|---|---|---|
| Comparative Test 1 | 25 | None | 1005 | 207 |
| Comparative Test 2 | 20 | None[a] | 866 | 220 |
| Example | 20 | 5[b] | 670 | 175 |

[a] 5 g of furfuryl alcohol was added.
[b] A 20% solution of resorcinol in furfuryl alcohol.

EXAMPLE 2

The general procedure of Example 1 using the same phenolic resole resin binder was followed except that other accelerators were employed. Results given in Table II show that solutions of catechol, hydroquinone, and phloroglucinol are also effective accelerators for phenolic resole resin binders.

TABLE II

| Resin (grams) | Accelerator (grams) | Strip Time (seconds) | Tensile Strength (psi) |
|---|---|---|---|
| 25 | None[a] | 1420 | 250 |
| 20 | 5 (20% catechol in furfuryl alcohol) | 770 | 280 |
| 20 | 5 (20% hydroquinone in furfuryl alcohol) | 1230 | 277 |
| 20 | 5 (20% phloroglucinol in furfuryl alcohol) | 1138 | 257 |

[a]Comparative test - not an example of this invention.

When the test using the catechol accelerator was repeated with sand cooled to 20° C., the tensile strength was 257 psi and the strip time was 1450 seconds. This shows that use of the accelerator with cold sand gives essentially the same cure rate as the control run at a higher temperature. Thus, there was no need to increase the catalyst level to obtain a satisfactory cure rate with the cold sand.

EXAMPLE 3

The general procedure of Example 1 was repeated using a furan-based resin. The resin used was a commercially available furfuryl alcohol/phenolic resole/urea-formaldehyde resin, Acme Super Set 935, available from the Acme Resin Corporation, Forest Park, Ill. It has a viscosity (25° C.) of 50 cps, a water content of 4%, and contains 2% nitrogen. The acid catalyst was a solution containing 57% p-toluenesulfonic acid and 9.6% benzenesulfonic acid in methanol. Test results given in Table III show that resorcinol in various solvents is an accelerator for this resin.

TABLE III

| Resin (grams) | Accelerator (grams) | Strip Time (seconds) | Tensile Strength (psi) |
|---|---|---|---|
| 25 | None[a] | 760 | 248 |
| 22.5 | 2.5 (55% resorcinol in water) | 660 | 202 |
| 22.5 | 2.5 (60% resorcinol in 25% aqueous methanol) | 563 | 233 |
| 20 | 5 (20% resorcinol in furfuryl alcohol) | 515 | 228 |

[a]Comparative test - not an example of this invention.

EXAMPLE 4

This example demonstrates that sand cores which are prepared using an accelerator of this invention give products with lower hot compression strengths. This gives cores with better shake-out properties. Sand mixes were prepared by the general procedure of Example 1 using the phenolic resole resin and acid catalyst of that system. These were shaped into standard cylindrical specimens 2 inches long and 1½ inches in diameter using a No. 754A Dietert sand rammer, and hardened steel specimen tubes. The specimens were allowed to cure overnight before their hot compression strength was measured. These tests employed a No. 785 Dietert Thermolab Dilatometer following the test procedure described in the American Foundrymen's Society Mold and Core Test Handbook, Section 9.4. Tests were carried out at 982° C. with 60 seconds soaking time at 50 psi load. Results given in Table IV are the average strengths for three test specimens.

TABLE IV

| Resin (grams) | Accelerator (grams) | Average Specimen Weight (grams) | Hot Compression Strength (psi) |
|---|---|---|---|
| 25 | None[a] | 52.9 | 332 |
| 21.25 | 3.75 (60% resorcinol in 25% aqueous methanol) | 53.1 | 213 |
| 21.25 | 3.75 (20% resorcinol in furfuryl alcohol) | 52.6 | 250 |

[a]Comparative test - not an example of this invention.

Thus, it is apparent that there has been provided, in accordance with the invention, cold-setting foundry compositions and a process using these compositions for the preparation of foundry cores and molds that fully satisfy the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to include all such alternatives, modifications and variations as set forth within the spirit and scope of the appended claims.

What is claimed is:

1. A cold-setting foundry composition useful for foundry cores and molds comprising:
   (a) a particulate refractory material;
   (b) between about 0.5 and about 6 parts by weight per 100 parts of particulate refractory material of a resin binder;
   (c) between about 10 parts and about 70 parts by weight per 100 parts of resin binder of an acidic curing catalyst; and
   (d) between about 2 parts and about 30 parts by weight per 100 parts of resin binder of an accelerator selected from the group: dihydroxybenzenes, monoalkyl, monoaryl, and aralkyl derivatives of dihydroxybenzenes, trihydroxybenzenes, and mixtures thereof.

2. The composition of claim 1 wherein the accelerator is selected from the group: resorcinol, catechol, hydroquinone, and phloroglucinol.

3. The composition of claim 1 wherein the accelerator is dissolved in a polar solvent.

4. The composition of claim 3 wherein the polar solvent is an alcohol.

5. The composition of claim 4 wherein the alcohol is furfuryl alcohol.

6. A "no-bake" process for making a shaped article, such as a foundry core or mold, which comprises:
   (a) mixing a particulate refractory material, an acidic catalyst, a resin binder, and between about 2 parts and about 30 parts by weight per 100 parts of resin binder of an accelerator selected from the group: dihydroxybenzenes, monoalkyl, monoaryl, and aralkyl derivatives of dihydroxybenzenes, trihydroxybenzenes, and mixtures thereof;
(b) forming the mixture of refratory material, catalyst, binder, and accelerator into the desired shape; and
(c) allowing the shaped mixture to cure at ambient conditions to produce such shaped article.

7. The process of claim 6 wherein the accelerator is selected fromt he group: resorcinol, catechol, hydroquinone, and phloroglucinol.

8. The process of claim 6 wherein the accelerator is dissolved in a polar solvent.

9. the process of claim 8 wherein the polar solvent is an alochol.

10. The process of claim 9 wherein the alcohol is furfuryl alcohol.

11. The shaped article formed by the process of claim 6.

12. The shaped article formed by the process of claim 7.

13. The shaped article formed by the process of claim 9.

14. The shaped article formed by the process of claim 10.

* * * * *